Jan. 22, 1957     F. T. MOSER     2,778,322
EXTRUSION NOZZLE
Filed March 2, 1953
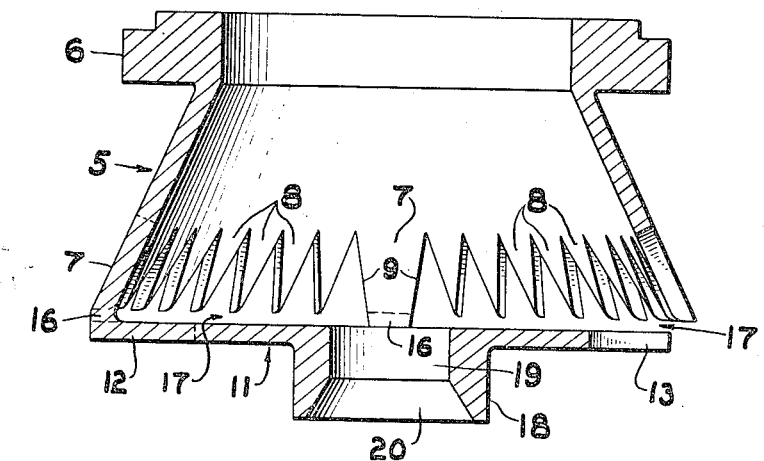
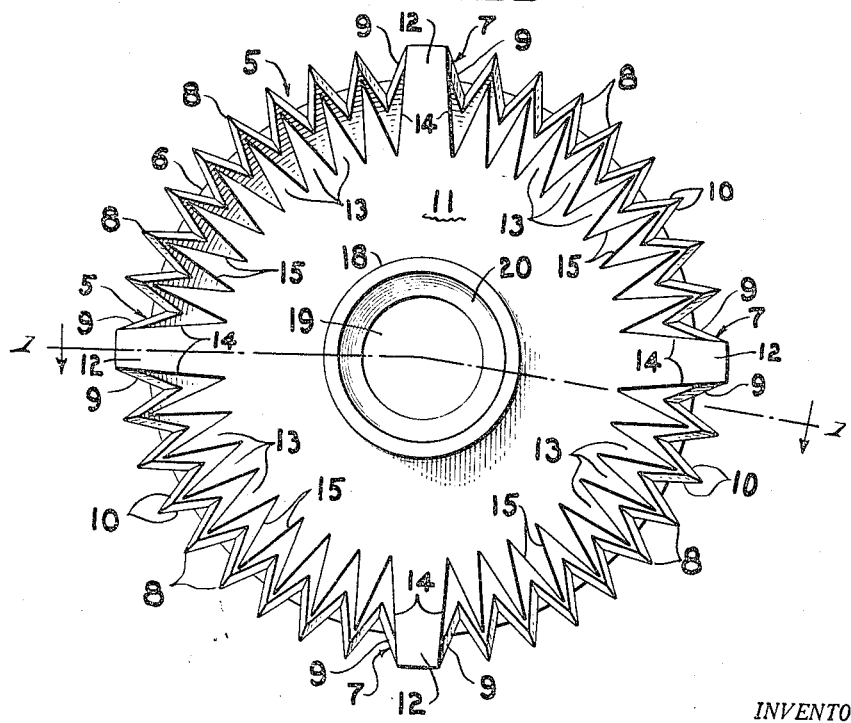
INVENTOR.
Frank T. Moser
BY
Roy A. Plant
atty.

United States Patent Office 2,778,322
Patented Jan. 22, 1957

2,778,322
EXTRUSION NOZZLE
Frank T. Moser, Easton, Pa.

Application March 2, 1953, Serial No. 339,740

4 Claims. (Cl. 107—14)

The present invention relates broadly to dispensing apparatus, and in its specific phases to an extrusion die or nozzle for such apparatus.

Dispensing machines of various types have previously been proposed and maufactured for use by bakers in making doughnuts, drop cookies, and the like, as well as for producing macaroni and spaghetti. However little has been done in the field of ice cream dispensing machines of the type in which the ice cream is extruded through an extrusion die or nozzle into a cup or the like to form a decorative hollow top body of ice cream, following which a quantity of jelly, marmalade or the like can be placed on same to form an "ice cream tart." It was a recognition of the need of such dispensing apparatus by the ice cream producing field, and a knowledge of the shortcomings of the devices previously proposed for various purposes which led to the conception and development of the present invention.

Accordingly among the objects of the present invention is the provision of a new and improved extrusion die or nozzle for machines adapted for handling and extruding ice cream, sherbets, and ices.

The principal object of the present invention is to provide a novel die or nozzle construction from which the bulk of the ice cream extruded therethrough into a suitable receiving cup, which is preferably edible, will be discharged laterally and downwardly between peripheral comb teeth while some of the ice cream will be discharged straight downward from the bottom of the die or nozzle. The quantities of ice cream thus simultaneously discharged form a mound in the receiving cup with a depressed center for subsequently filling with jelly or the like, and with alternating grooves and ribs radiating from said depressed center, thus giving a very attractive ornamental appearance.

A further object is to provide a novel die or nozzle construction in which the ice cream extruded between the comb teeth will stimulate petals of a flower, said petals being of attractive radial ribbed design.

A further object is to provide a novel die or nozzle comprising a sleeve and a bottom plate unitarily joined to each other, the lower end of said sleeve and the peripheral edge of said bottom plate having matching comb teeth and said bottom plate having a central opening for discharging part of the ice cream directly downward in desired manner.

Another object is to provide the sleeve and the bottom plate with a relatively few wide teeth uniformly spaced apart circumferentially and with a relatively great number of narrow teeth between said wide teeth, said wide teeth of the sleeve and bottom plate forming effective juncture portions uniting the plate and sleeve as well as dividing the ice cream extruded between the teeth into petal simulations.

Another object is to provide a die or nozzle wherein the pressure of forcing ice cream out of its outlets consolidates the ice cream and makes it hold its shape better prior to hardening same in a low temperature storage compartment.

Yet another object is to provide an extrusion die or nozzle of extreme simplicity having no moving parts, and requiring no care within the sleeve of same.

Still further objects and advantages of this invention will appear as the description proceeds.

To the accomplishment of the foregoing and related ends, the invention, then, consists of the extrusion nozzle means hereinafter fully described and particularly pointed out in the claims, the annexed drawing and the following description setting forth in detail certain means for carrying out the invention, such disclosed means illustrating, however, but one of various ways in which the principle of the invention may be used.

In the annexed drawing:

Figure 1 is a vertical sectional view of the die or nozzle on the two planes indicated by the line 1—1 of Figure 2 looking in the direction of the arrows.

Figure 2 is a bottom plan view of the die or nozzle.

The construction of the nozzle or die disclosed in the drawing is preferred and will be specifically described, but it is to be understood that variations may be made within the scope of the invention.

A sleeve 5 is provided, said sleeve having a flange 6 at its upper end adapting it for connection to the outlet of an ice cream dispensing machine. This sleeve 5 is of downwardly and outwardly flared frusto-conical form, and may be of uniform thickness from the flange 6 to its lower end, which is provided with a multiplicity of comb teeth. There are a few (preferably four) relatively wide comb teeth 7 uniformly spaced apart circumferentially of the bottom of the sleeve, and a relatively great number of narrow comb teeth 8 uniformly spaced apart circumferentially between said wide teeth 7. These wide teeth 7 are blunt-ended and the narrow teeth 8 are sharp-ended. The edges 9 and 10 of said teeth 7 and 8, respectively, are preferably straight, with the edges of each tooth normally meeting the adjacent edges of the adjacent teeth at an acute angle.

A substantially flat bottom plate 11 is secured to the sleeve 5, said bottom plate having peripheral comb teeth. In this set of teeth there are a few relatively wide teeth 12 uniformly spaced apart circumferentially, and a relatively large number of narrow teeth 13 uniformly spaced apart circumferentially between said wide teeth 12. All of the teeth 12 and 13 are radially disposed, the wide teeth 12 are blunt-ended and the narrow teeth 13 are sharp-ended. The edges 14 and 15 of the teeth 12 and 13, respectively, are relatively straight and the edges of each tooth normally meet those of the adjacent teeth at an acute angle.

The wide teeth 12 of the bottom plate 11 are equal in number to the wide teeth 7 of the sleeve 5, and said wide teeth 12 and 7 are of substantially uniform width. Similarly, the narrow teeth 13 of the bottom plate 11 are equal in number to the narrow teeth 8 of the sleeve 5, and said narrow teeth 13 and 8 are of substantially uniform length in each group. The wide and narrow teeth of the sleeve 5 and bottom plate 11 accurately match, as seen in Figure 2. However, the bottom plate 11 and its teeth 13 are a slight distance below the teeth 8 of the sleeve 5, as seen in Figure 1.

The outer ends of the wide teeth 12 of the bottom plate 11 are secured at 16 (Figure 1) to the lower ends of the wide teeth 7 of sleeve 5. This is preferably done by welding or brazing, and if desired the welding or brazing material may be the means of spacing the bottom plate 11 and its teeth 13 downwardly from the teeth 8 of the sleeve 5. This spacing provides arcuate ice cream discharge slots 17 between the wide teeth of the sleeve 5 and bottom plate 11, and the narrow comb teeth of said sleeve and bottom plate provide zig-zag comb-toothed edges for these slots 17.

The bottom plate 11 is provided with a central downwardly projecting integral boss 18 and with an ice cream discharge opening 19 from the top of said plate to the bottom of said boss. The lower end of the opening 19 is preferably downwardly and outwardly flared at 20.

In use, the ice cream is extruded through the nozzle or die into a cup or the like, which cup may of course be edible, if desired. The bulk of the ice cream is extruded laterally and downwardly through the slots 17 and between the teeth 8 and 13 which make it simulate ribbed petals. A sufficient quantity of the ice cream is extruded through the opening 19 to aid in building up the desired mound shape for the bottom of the mass of extruded ice cream. The finished body of extruded ice cream, however, has a central depression in its upper surface to receive jelly, marmalade or the like. An attractive "ice cream tart" is thus produced having the appearance of a flower with attractively ribbed petals.

The specific construction herein disclosed has proven to be of advantage from all standpoints and is preferably followed. Attention, however, is again invited to the possibility of making variations within the scope of the invention.

Other modes of applying the principle of my invention may be employed instead of the one explained, change being made as regards the article herein disclosed, provided the means stated by any of the following claims or the equivalent of such stated means be employed.

I therefore particularly point out and distinctly claim as my invention:

1. An extrusion nozzle, comprising a frusto-conical shaped sleeve member having open ends, the larger open end being provided with outwardly inclined teeth in comb-like formation extending along its entire peripheral portion, and a plate member of substantially the same size and contour as the said larger open end, said plate having an orifice extending therethrough and being provided with radially directed teeth in comb-like formation extending along its entire peripheral portion, said plate and tubular members being joined by leg-like means in the form of relatively wide teeth on each at points spaced circumferentially of their respective peripheral portions, so that the respective teeth of said members are in spaced confronting relationship, said means being provided with a weld between pairs of confronting teeth forming the leg-like means of said members, the teeth of each pair also being wider at their ends than the remaining teeth of said members, so that spaced openings between said members are formed which are arcuate and have comb-like edges.

2. An extrusion nozzle as set forth in claim 1; wherein said orifice in said plate is substantially centrally located in same, and there is a relatively short boss on the outer face of said plate with said orifice passing substantially centrally therethrough and being outwardly flared at its outer end.

3. An ice cream extrusion nozzle comprising a sleeve having a fully open interior from top to bottom and having a few wide ended teeth uniformly spaced apart circumferentially and disposed at the lower end of said sleeve, said sleeve also having a mounting flange on its upper end and a greater number of narrow comb teeth equally spaced apart circumferentially between said wide ended teeth; and a bottom plate having a few wide ended peripheral teeth secured to the ends of said wide ended teeth of said sleeve and of equal number to same, said bottom plate also having a greater number of narrow peripheral comb teeth equally spaced apart between its wide ended teeth, the points of the comb teeth, of said bottom plate being spaced slightly below the plane of the points of said comb teeth of said sleeve and with the sleeve and plate having an equal number of teeth with their points in alinement with each other and substantially equally spaced apart.

4. A structure as specified in claim 3; said sleeve being of downwardly flared frusto-conical form, and said bottom plate having an opening therethrough substantially in the center of same.

References Cited in the file of this patent

UNITED STATES PATENTS

| | | |
|---|---|---|
| 573,432 | Megson | Dec. 15, 1896 |
| 827,306 | Herisse | July 31, 1906 |
| 2,262,485 | Belshaw | Nov. 11, 1941 |
| 2,486,194 | Moser | Oct. 25, 1949 |
| 2,651,270 | Moser | Sept. 8, 1953 |